United States Patent [19]
Frederick

[11] Patent Number: 5,781,146
[45] Date of Patent: Jul. 14, 1998

[54] AUTOMATIC HORIZONTAL AND VERTICAL SCANNING RADAR WITH TERRAIN DISPLAY

[75] Inventor: Philip R. Frederick, Salt Lake City, Utah

[73] Assignee: Imaging Accessories, Inc., Salt Lake City, Utah

[21] Appl. No.: 613,017

[22] Filed: Mar. 11, 1996

[51] Int. Cl.⁶ .............................. G01S 13/95; G01S 7/04
[52] U.S. Cl. ..................... 342/26; 342/179; 342/197
[58] Field of Search .......................... 342/26, 65, 176, 342/179, 185, 197

[56] References Cited

U.S. PATENT DOCUMENTS

| | | | |
|---|---|---|---|
| 4,179,693 | 12/1979 | Evans et al. | 342/64 |
| 4,520,445 | 5/1985 | Keearns | 342/65 X |
| 4,584,646 | 4/1986 | Chan et al. | 342/64 X |
| 4,700,307 | 10/1987 | Mons et al. | 342/64 X |
| 4,829,304 | 5/1989 | Baird | 342/63 |
| 4,939,663 | 7/1990 | Baird | 342/64 X |
| 5,379,215 | 1/1995 | Kruhoeffer et al. | 364/420 |

*Primary Examiner*—John B. Sotomayor
*Attorney, Agent, or Firm*—Thorpe North & Western, LLP

[57] ABSTRACT

A weather radar and terrain map display system for aircraft with the terrain elevation and weather information displayed in an easy to read and comprehend presentation. The system includes an antenna for transmitting and receiving radar signals, a receiver for digitizing the reflected radar signals, and a computer for storing the signals and calculating the latitude and longitude coordinates of the locations from which the reflected radar signals were reflected, and for storing terrain elevation data. A display simultaneously shows a plan view image and vertical views of contoured terrain elevation data and the weather conditions found by the radar. The terrain and weather displays are superimposed over one another to enable quick and efficient location of critical terrain and weather conditions. The system can also calculate the latitude and longitude coordinates of the radar echoes without antenna stabilization.

32 Claims, 7 Drawing Sheets

AUTOMATIC HORIZONTAL AND VERTICAL SCANNING RADAR WITH TERRAIN DISPLAY

BACKGROUND OF THE INVENTION

This invention relates to a radar system primarily for aircraft, using automatic horizontal and vertical scanning, capable of displaying of radar signals superimposed with terrain elevation data in a plan view and in supplemental front and side vertical views.

Each year aircraft crash in unacceptable numbers. Investigations into these crashes show that often the cause of the crash is not due to mechanical problems. These types of crashes are described as controlled flights into terrain. Controlled flights into terrain often result from a pilot's lack of three dimensional situation awareness. A graphic display of the aircraft position relative to terrain would improve such awareness. Pilots need information about their aircraft's position relative to terrain elevation in an easy to read and comprehend presentation. The availability of detailed, world-wide data bases providing terrain elevations make such a display possible.

Most large aircraft have Ground Proximity Warning Systems (GPWS) but the GPWS only provides a warning alarm rather than a visual display. This present invention provides a simple, accurate way of displaying to the pilot a visual image of the aircraft position relative to terrain elevation as well as to weather conditions in a form that may be seen at a glance with little pilot input. A glance at the display would help the pilot distinguish a GPWS's true warning signal from a false signal.

Conventional terrain alert warning systems, such as GPWS, presume either an aircraft descending into terrain or flying into rising terrain and provide "pull-up" alerts. However, some accidents occur in steep mountains where escape by pull-up is not a realistic possibility because the terrain rises higher than the aircraft can climb. In such terrain, pilots need a visual display, including a vertical presentation of the terrain, with a terrain warning to supplement the pull-up alert.

SUMMARY OF THE INVENTION

This invention combines a radar weather display with a terrain elevation display in an easy to read and comprehensive presentation. Terrain elevation and weather information are displayed simultaneously. This allows the pilot to choose the best route to avoid high terrain and adverse weather.

An object of the invention is to provide a system that displays terrain elevation as well as aircraft altitude in a way that the relationship between the terrain and the aircraft can be seen at a glance.

Another object of the invention is to provide a system that simultaneously displays terrain elevation, weather conditions, and aircraft position on the same or on separate display screens.

Another object of the invention is to provide a system that depicts terrain and weather information so as to make clear at a glance the different between ground returns and adverse weather.

Another object of the invention is to provide on a single display terrain and weather information and the aircraft position in vertical frontal and vertical side views in addition to the conventional plan view.

Another object of the invention is to provide a system that distinguishes between radar weather echoes and radar terrain echoes by blanking all radar returns below a selected elevation above the terrain elevation stored in a data base. This would eliminate or reduce ground clutter, depending on the altitude selected.

Another object of the invention is to provide a system that distinguishes between radar weather echoes and radar terrain echoes by blanking all radar returns above a selected elevation below the terrain elevation stored in a data base.

Another object of the invention is to make conspicuous the terrain elevation that is at, above, or slightly below the altitude of the aircraft and provide for flashing or otherwise highlighting these critical regions.

Another object of the invention is to display terrain elevation with easy to comprehend contour line mapping image.

Still another object of the invention is to correct for aircraft roll and pitch with the stabilization off.

One embodiment of the invention is a system with an antenna for transmitting radar signals out from the aircraft and for receiving returning radar signals, and a microprocessor for digitizing the returned radar signals, calculating the latitude and longitude of the locations from which the reflected radar signals were reflected, and a random access memory (RAM) for storing the digitized signals and the related latitude, longitude, and altitude. A RAM stores terrain elevation data referenced to latitude and longitude coordinates of the ground over which the aircraft will travel. The RAM also stores an elevation coding table that assigns a distinctive color and pattern to each range of elevation and the microprocessor compares the height in the terrain elevation data at each coordinate with a stored elevation color coding table.

A display RAM receives the data from the microprocessors and simultaneously displays the data in a plan view image over a horizontal range. A distinctive color and pattern represents each terrain elevation height zone on the plan view image. The computer uses the terrain elevation data to generates contour lines on the display. The weather display and terrain data display are superimposed over one another.

The system has an altimeter input and a microprocessor that compares the altitude of the aircraft to the terrain elevation data and selects the latitude and longitude coordinates of critical terrain elevation data. Critical terrain elevation data includes the terrain at a selected elevation near or above the altitude of the aircraft. The critical terrain is highlighted on the display. The system may produce an alarm signal when critical terrain elevation data is selected.

The system includes both a vertical front view and at least one vertical side view showing the weather display and terrain data display superimposed over each another.

The system has input from a navigation means for locating the position of the aircraft and a means for superimposing an aircraft position marker at the latitude and longitude coordinates of the present position over the weather display and terrain data on the plan view image. An aircraft position marker is superimposed at the determined altitude of the aircraft over the weather display and terrain data on the vertical view images.

This system can distinguish between radar weather echoes and radar terrain echoes by blanking all radar returns below a selected elevation above the terrain elevation stored in a data base. This allows the pilot to exclude radar returns at or below a surface in space that corresponds with terrain but is a chosen altitude above it. This would be particularly

3 valuable in mountainous country since many thunderstorms develop over mountains, making it difficult to distinguish between bad weather and high terrain.

Likewise, this system can distinguish between radar weather echoes and radar terrain echoes by blanking all radar returns above a selected elevation below the terrain elevation stored in a data base. This allows the pilot to exclude radar returns at or above a surface in space that corresponds with weather but is a chosen altitude below it. This would be useful for search and surveillance radars. The pilot could toggle between the ground and weather returns quickly and easily.

In one embodiment, the pilot chooses a region at a fixed distance from the aircraft, the region having a transverse length and a vertical distance. A microprocessor continually determines the latitude and longitude coordinates of locations within the region as the aircraft moves through space. The microprocessor compares the latitude and longitude coordinates of the locations within the region to the latitude and longitude of the stored terrain elevation data and selects the latitude and longitude of any location within the region that has the same latitude and longitude as any stored terrain elevation data. The system generates an output signal alarm if the latitude and longitude of any terrain elevation data is selected and the selected terrain elevation data is highlighted on the display.

In another embodiment, the microprocessor calculates the latitude and longitude coordinates of the radar echoes even when antenna stabilization is not used. The microprocessor directly calculates the antenna slew corrected for bank of the aircraft and the antenna tilt angle corrected for pitch of the aircraft from the antenna slew corrected for roll, the range or distance of radar echo, the pitch in degrees above or below horizontal, the antenna elevation relative to the horizontal plane corrected for roll, and the bank angle.

BRIEF DESCRIPTION OF THE DRAWINGS

The above and other objects, features and advantages of the invention will become apparent from a consideration of the following detailed description presented in connection with the accompanying drawings.

4

DETAILED DESCRIPTION

Figure 1:
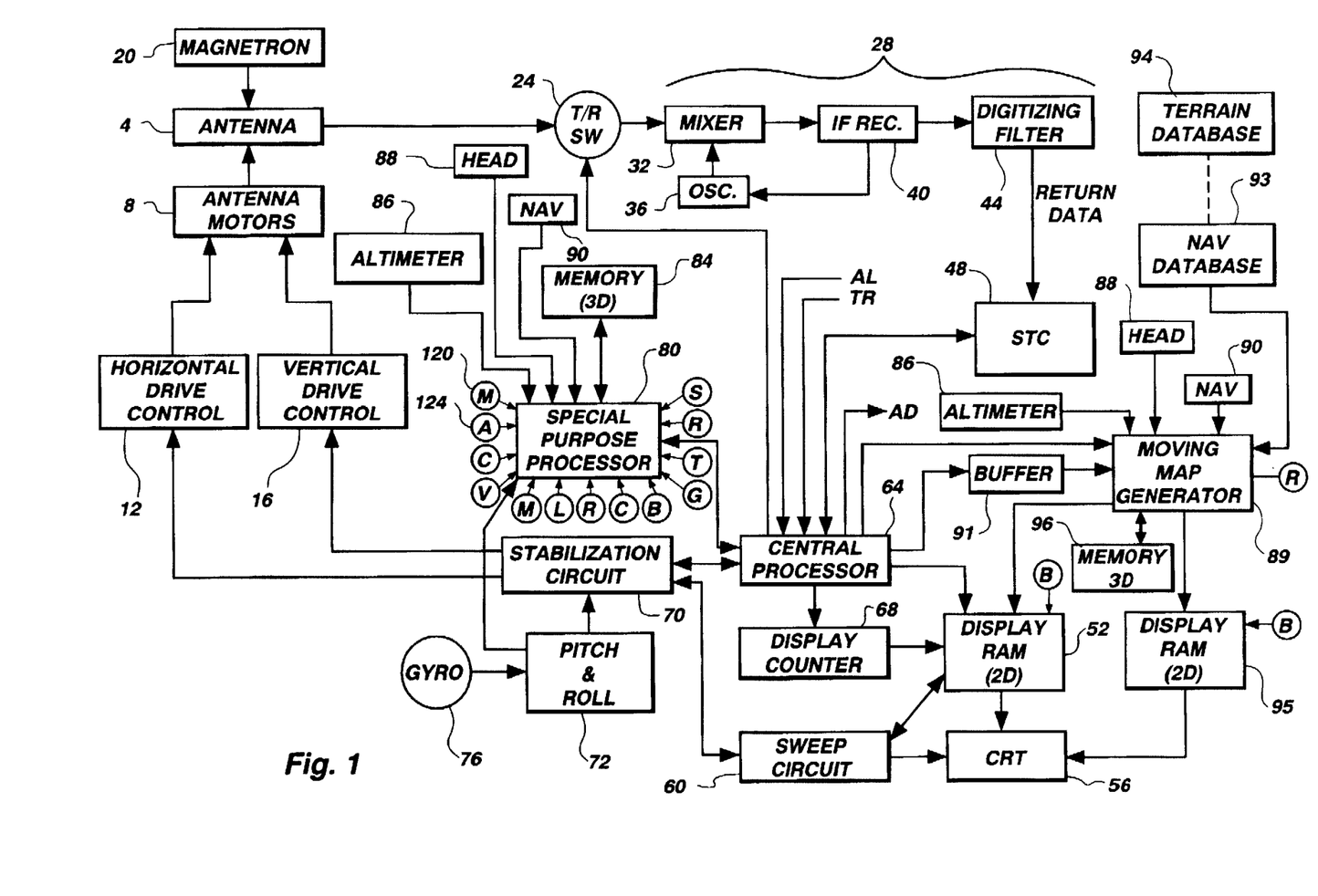
FIG. 1 shows a block diagram of the airborne radar system and the weather and terrain display.

FIG. 1 shows one illustrative embodiment of the present invention. The system includes a conventional radar antenna 4 such as a phased array flat plate antenna with fixed frontal gain pattern. The antenna 4 is mounted, to oscillate back and forth and direct a beam horizontally outwardly, and to move up and down to direct a beam vertically outwardly.

Antenna stepper motors 8 are coupled to the antenna 4 to move and position the antenna in conventional x and y directions of an orthogonal coordinate system. Horizontal drive control circuit 12 and a vertical drive control circuit 16 supplies stepper signals directing the antenna motors 8 to move the antenna 4 in a programmable preselected pattern. The horizontal drive control circuit 12 supplies the stepper signals to move the antenna 4 in the horizontal direction. The vertical drive control circuit 16 supplies the stepper signals to move the antenna 4 in the vertical direction.

In combination, the two drive control circuits 12 and 16 completely determine the pattern and speed at which the antenna 4 moves. Patterns of movement of the antenna 4 are shown in U.S. Pat. No. 4,940,987, which is incorporated herein by reference. The horizontal drive control circuit 12 and vertical drive control circuit 16 respond to signals from a stabilization circuit 70 that corrects the position of the antenna 4 to compensate for pitch and roll of the aircraft. However, the system can correct for aircraft pitch and roll even with the stabilization circuit off.

A standard microwave generator, such as a magnetrom 20, supplies transmit signals to the antenna 4. The antenna 4 both transmits radar signals and receives reflected radar signals. A transmit and receive switch 24 allows the flow of electrical signals from the antenna to receiver circuitry 28 when the antenna is in the receive phase, but blocks the flow of such electrical signals when the antenna is in the transmit phase. This protects the receiver circuitry 28 from transmission energy that might otherwise flow to the receiver circuitry causing damage.

The receiver circuitry 28 includes a mixer 32 that converts the high frequency return signals to lower frequency signals suitable for processing. A local oscillator 36 supplies an oscillatory signal of a certain frequency to the mixer 32 that produces an intermediate frequency (IF) signal from the oscillator signal and the incoming return signals. An IF receiver 40 adjusts the frequency of the oscillator signal to maintain the desired frequency of the IF signal. The IF receiver 40 amplifies the IF signal received from the mixer 32 and supplies the amplified signal to a digitizing filter 44. The digitizing filter 44 converts the received analog signal into a digital signal, typically two or three bits in length, and filters the digital signal for transfer to the next stage of the system.

A digital STC (Sensitivity Time Control) correction processor and logic unit 48 is a conventional circuit package that receives digital return data from the digitizing filter 44 and adjusting the intensity of the data to compensate for differing distances from which the radar return data is received (since near return data is more intense than from distant return data). The compensated data, including distance information, is then supplied to a central processor 64 that, in turn, supplies it to a special purpose processor 80 for storage in a three-dimensional random access memory 84.

The central processor 64 is a conventional microprocessor that controls and coordinates the operations of the other circuits and units of the radar system, including a display RAM 52, a display counter 68, and the stabilization circuit 70. The display RAM 52 is a two-dimensional random access memory in which the central processor 64 stores the picture image data (prepared by the special purpose processor 80 to be displayed on a cathode ray tube (CRT) 56. This data is supplied to a sweep circuit 60 that, in response to the data, produces scan signals for application to the CRT 56. Return data is supplied to the display RAM 52 to addresses determined by the special purpose processor 80 and identified and conditioned for storage by the display counter 68. The display counter 68 also addresses the display RAM 52 to refresh the CRT 56 and generates the horizontal and vertical retrace trigger signals. Such display procedure is known in the radar and video display system art.

The stabilization circuit 70 includes a microprocessor-based subsystem that monitors signals from a pitch and roll circuit 72 coupled to an aircraft attitude sensor such as a conventional gyroscope 76, and supplies control signals to the horizontal and vertical drive control units 12 and 16. These units, in turn, generate compensating stepper signals for positioning the antenna 4 to account for the pitch and roll of the aircraft detected by the gyroscope 76. The control units 12 and 16, control the initial positioning and later movement and speed of the antenna 4, all under control of the central processor 64. The stabilization circuit 70, pitch and roll circuit 72, and gyroscope 76 are of conventional design and operation.

Figure 5A:
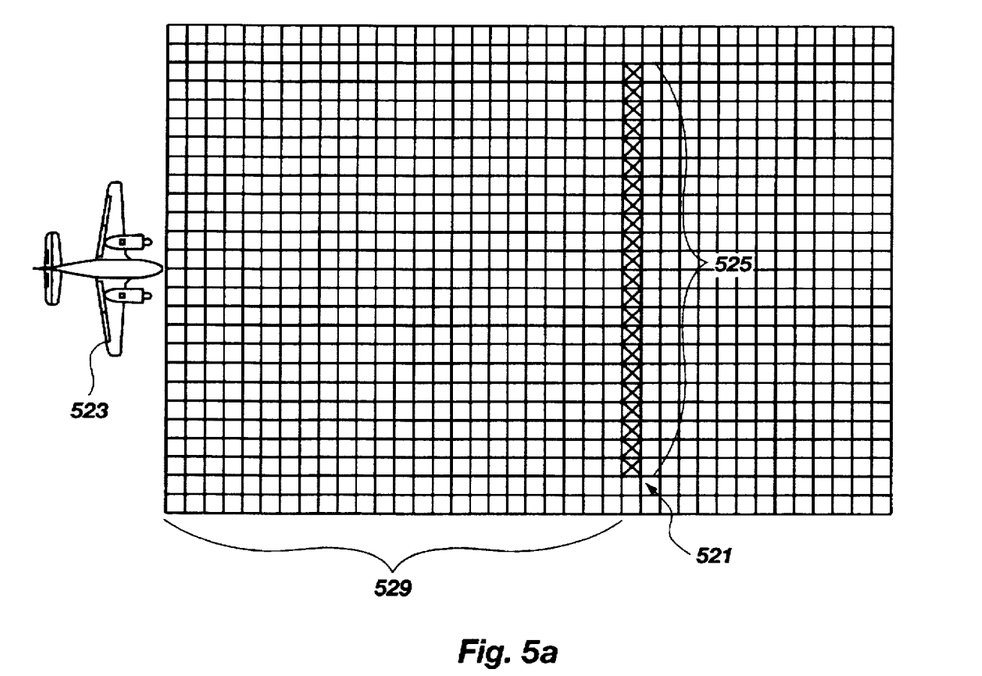
FIG. 5a is a graphic representation of the horizontal range of radar returns with selected voxels highlighted.
Figure 5B:
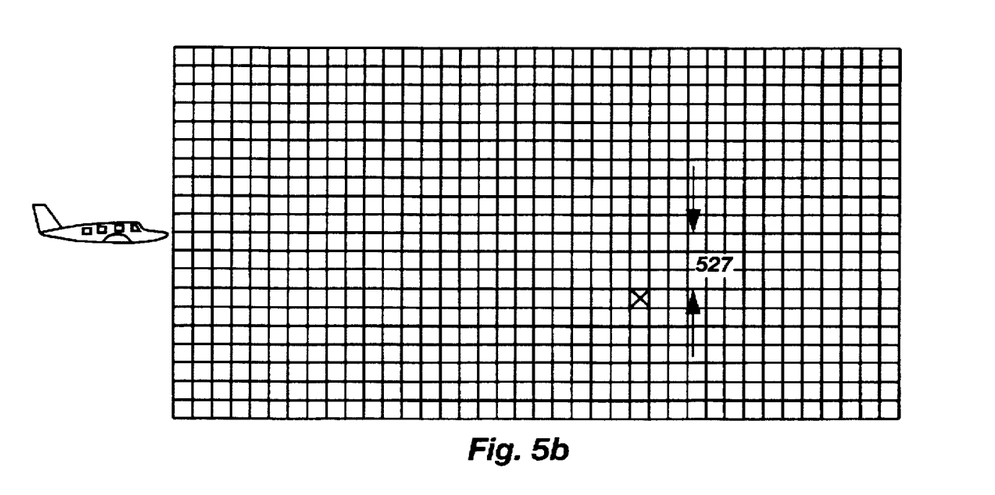
FIG. 5b is a graphic representation of the vertical range of radar returns with a voxel highlighted.

However, using a conventional stabilization circuit limits the range of antenna tilt. For example, the maximum manual vertical tilt typically is limited to plus or minus fifteen degree above the horizontal. With stabilization off the limit may be plus or minus thirty degrees. This system can still correct for roll and pitch, even with the stabilization off, by directly supplying to a special purpose processor 80 the roll and pitch angles 72. The special purpose processor uses this data, along with the data described below, to calculate the actual position of an object shown by the radar returns. See FIG. 5 and the related discussion below.

The special purpose processor 80 receives and stores in the three-dimensional memory 84 all digital radar return data, including distance information, obtained from the antenna 4 sweeping horizontally in the different sweep planes and tilt angles. The central processor 64 supplies the return data received and digitized from each sweep plane to the special purpose processor 80. The special purpose processor updates the old data from the sweep plane in the memory 84. The memory 84 includes a three-dimensional array of addresses, each for storing data representing a different voxel (volume element) in space from which the corresponding radar return data was received. The location of the voxel in space and the address in the memory 84 for storing data representing the voxel is determined from distance information and antenna 4 position.

Figure 2:
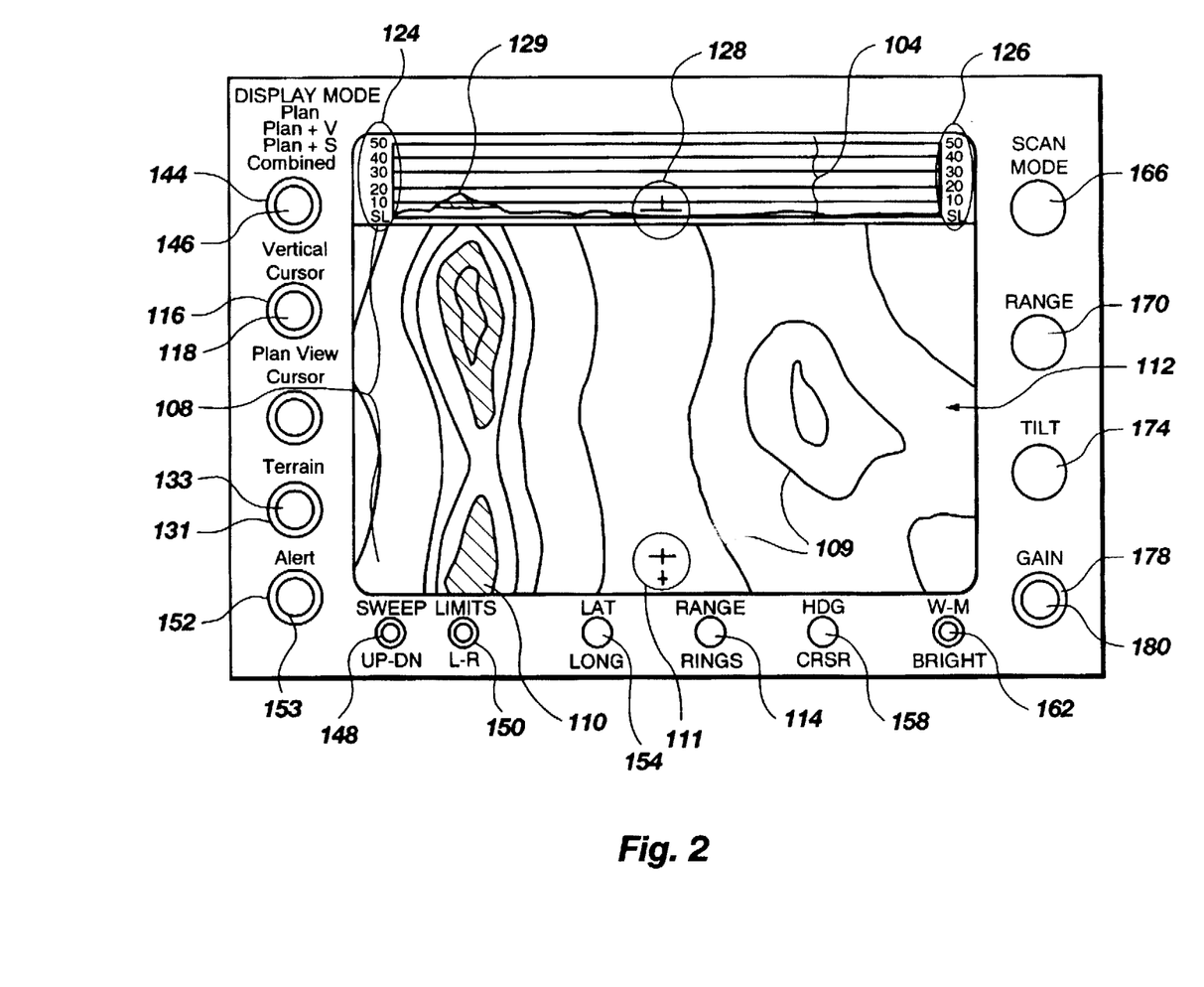
FIG. 2 shows a front view of a cathode ray tube display made with the terrain elevation contoured in the plan view and a corresponding vertical front view.
Figure 3:
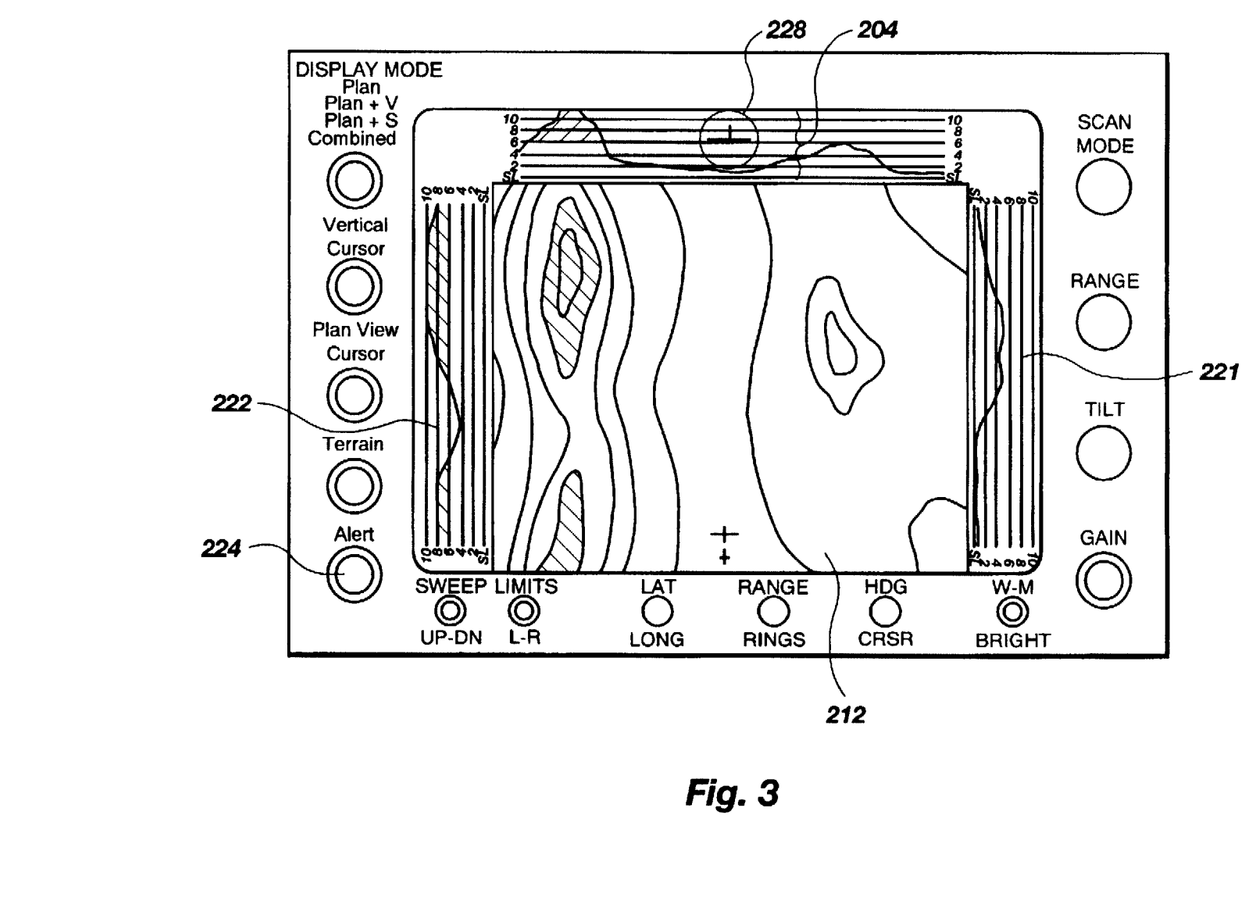
FIG. 3 is a front view of the cathode ray tube showing an alternative display with a central plan view and a vertical front view at the top and a vertical side view on each side.

From the stored radar data, the special purpose processor 80 constructs the two-dimensional display data stored in the two-dimensional display RAM 52 and displayed on the cathode ray tube 56. This two-dimensional display includes a horizontal, plan view image with a vertical front view image and one or more vertical side view images of the terrain and weather condition. The vertical front view is above the horizontal plan view, on the display, as shown in FIG. 2 and FIG. 3. The manner of retrieving and formatting the data, and of selecting the thickness of the "slices" of radar returns to be displayed using the cursor control dual knob 136 is fully discussed in U.S. Pat. No. 4,940,987. already incorporated by reference.

FIG. 2 is a front view representation of the cathode ray tube 56 showing a display area screen 112 on which the terrain images are displayed. A horizontal plan view image is at 108. Contour lines 109 show terrain elevation in the same way that contour lines show elevation on a topographic map. Critical terrain 110 is highlighted by conspicuously displaying in a contrasting color or pattern within the corresponding contour lines. Critical terrain is terrain that is at, above, or within a preselected elevation below the altitude of the aircraft. Altitude shown by an altimeter does not correspond exactly to terrain elevation because of barometric pressure, temperature and lapse rate fluctuations, and other variables that affect the altimeter readings. Therefore, a safety margin may be provided by highlighting terrain one or two thousand feet below the assumed altitude of the aircraft. For example, the pilot may choose to highlight terrain with an elevation within 2000 feet below the altitude of the aircraft. A vertical front view image is at 104. Critical terrain 129 on the vertical front view image is also highlighted.

To highlight the critical terrain, the moving map processor 89 receives the altitude from the altimeter 86 and signals to the display RAM 95 emphasize all pixels where the elevation is equal to the altitude of the aircraft minus the selected margin. Emphasis of a defined area of the display is a common practice in computer graphics. Alternatively, the pilot can enter barometric pressure and the moving map generator can be programmed to adjust the altitude measured by the altimeter for the current barometric pressure. Algorithms for such conversion are in wide use.

With these displays, a pilot flying near critical terrain can determine the range or distance of the critical terrain from the plan view image 108 and the distance or range indicia produced by the cathode ray tube 36 from stored distance information. The range indicia is displayed with control 114. The pilot can determine the elevation of the terrain with the vertical front view image 104 and altitude indicia 124 and 126 produced on the screen from stored altitude information.

The pilot selects the plan view altitude range desired with knobs 116 and 118 on the display panel of FIG. 2. Knob 116 sets the upper limit of the desired altitude range and knob 118 sets the lower limit. The operation of the plan view altitude range is described in detail in U.S. Pat. No. 5,202, 690, which is incorporated herein by reference.

An aircraft symbol 128 is on the screen 112 to provide the pilot with the altitude of the aircraft relative to the indicia 124 and 126. To develop the aircraft symbol 128 on the display, an altimeter 86, shown in FIG. 1, measures the altitude of the aircraft and sends those measurements to the special purpose processor 80. The special purpose processor stores the readings and produces for display data an image of the aircraft 128. The aircraft symbol enables the pilot to quickly visualize his elevation relative to terrain and weather into which he is flying as well as the height of the terrain and weather condition above sea level.

FIG. 3 shows an alternative display with the plan view 212 in the center. The vertical, frontal view 204 is directly above it and vertical side view projections 221 and 222 are on each side. The side view on the left 222 is a vertical view of a trace across the left half of the region displayed in the plan view. The side view on the right 221 is a view of a trace across the right half of the region. Alternatively, a single vertical side view could cover the entire region. The side view displays are vertically oriented so the features are displayed at the same levels as those features in the plan view. These are standard features of orthographic displays.

The scale of the vertical displays in FIG. 3 is changed from FIG. 2 to provide greater vertical resolution, useful when the aircraft is at a low attitude. As shown in FIG. 3, the aircraft is at 7000 feet but the terrain elevation extends above 10,000 feet. The pilot selects the vertical display scale factor using the inner knob of the Terrain Display Control 224.

Although FIG. 2 shows only contoured terrain information, radar and map images can be superimposed over the terrain display. Orthographic, multi-planar projections portray the aircraft's height relative to terrain graphically and conveniently. They are standard projections in engineering and architectural drawings. They require no recalculation of dimensions but only translations and rotations as the aircraft advances and changes heading.

Another feature of the invention that enables the pilot to find high terrain and adverse weather conditions near the aircraft uses moving map display technology that has become popular in recent years. See U.S. Pat. No. 5,202,690, already incorporated by reference. The feature of the present invention adapts the moving map concept to display not only map data but to display both terrain and weather conditions relative to latitude and longitude so the pilot may view the location of the aircraft relative to terrain and weather.

As shown in FIG. 1, a compass system 88 for determining the heading of the aircraft, that is the direction of the long or roll axis of the aircraft, and the altimeter 86 feed both into the special purpose computer 80 and into a moving map generator 89 continuously. (In FIG. 1, the altimeter 86, the compass system 88, and the navigation system 90 are shown in two places.) A navigation system 90, such as LORAN, INS (inertial navigation system), VLNF (very low frequency navigation system), or GPS (global positioning satellite system), determines the position of the aircraft and the track of the aircraft over the earth. The navigation system 90 continuously supplies information both to the special purpose processor 80 and to the moving map generator 89. Both the compass system 88 and the navigation system 90 are well known in the aircraft industry.

The central processor 64 stores in the buffer 91 the plan view data, with corresponding latitude and longitude addresses for the data, and the vertical view data. The plan view data will include a selected altitude "thickness" of radar return signals and the vertical view data will include a selected horizontal "thickness" of radar return signals. Thus, the plan view image will comprise all echoes having latitude and longitude addresses within the selected altitude range, and the vertical view image composes all the echoes having the latitude and longitude addresses within the selected horizontal range. The data in the buffer 91, representing data showing the terrain and weather, combines with moving map data developed by a moving map generator 89.

The moving map generator 89 receives heading information, aircraft position information, and track information from the compass system 88 and navigation system 90, as does the special purpose processor 80. The moving map generator 89 also accesses and selects information from a terrain elevation data base 94 and from a navigational data base 93 that contains latitude and longitude addresses of navigation stations, airports, and way points. The navigational data base 93 and the terrain data base 94 are shown separately although normally they would be one data base. The terrain data base 94 supplies elevation data for terrain on the earth's surface based on a latitude-longitude grid.

A three dimensional RAM 96 provides memory, consisting of an array of addresses, each representing a voxel in space. The highest data point within each voxel is taken to be the voxel elevation. The moving map generator compares each voxel elevation with a look-up table in the RAM 96 associated with the moving map generator to determine the color for the display of that voxel. The look-up table has a different hue for each range of elevations. These hues are selected to be as similar to the usual colors of topographic maps as possible without using any of the colors regularly used in weather radar displays. The moving map generator also uses the look-up table to create contour lines. Generating lines connecting sequential points is standard technique well-known in the computer graphics field. Further, the filling-in of areas defined by such lines is also well known and common practice.

The look-up table in the moving map generator is also used to compare the altitude of the airplane with the elevation of the terrain. The regions having elevations above and within a selected level below the altitude of the aircraft are highlighted by attention getting signals as hatch marks or alternating flashing hues. The moving map generator also provides an output for an aural alarm, shown as AD in FIG. 1. The display of hues as a function of altitude and terrain is used in the vertical views also.

The elevation of the highest point in each voxel is also used to define the terrain surface in the vertical display. The moving map generator selects the highest elevation in each alignment of pixels, either forward or lateral for the region covered in the vertical displays. These elevation points are then connected by lines to form the maximum upper surface of terrain in the region displayed. As with the cursor functions, the plan view cursor can be used to define the region displayed during analysis of the terrain profiles.

As shown in FIG. 1, the moving map generator 89 retrieves such latitude and longitude addresses from the navigational and terrain data bases 93 and 94 within a selected distance from the aircraft. The pilot selects the distance with control knob 170 shown in FIG. 2. The setting information goes to both the special purpose processor 80 and the moving map generator 89, so both will develop display data over the same latitude-longitude range. From all of this information, the moving map generator 89 constructs or generates a map display of the navigation stations, airports, and way points, and a contoured terrain map positioned relative to latitude and longitude, of the area over which the aircraft is flying. The moving map generator converts the data to x, y coordinates for display through a second display RAM 95. Alternately, the moving map generator 89 may retrieve data from the buffer 91, converts it to x,y coordinates for display and supplies it directly to the display RAM 52 rather than through the display RAM 95.

The data from the display RAM 52, containing echo return information, and the display RAM 95, containing terrain elevation and map data, produce on the cathode ray tube 56 a plan view image showing weather conditions superimposed over terrain contours and map data. The central processor 64 supplies a synchronization signal to the moving map generator 89 as new data is supplied to the buffer 91. The moving map generator 89 can therefore synchronize and coordinate the supply of data to the display RAM 52 and display RAM 95 and the display of such information on the cathode ray tube 56.

As shown in FIG. 2, the system has manual controls to enable selection of the data displayed on the cathode ray tube 56. These controls include the display mode control 144, sweep limit controls 148 and 150, a latitude and longitude coordinate push button 154, a heading cursor button 158, a scan mode control 166, a tilt angle control 174, and a gain control 178. These controls, in the form of rotatable knobs or buttons, are on the display unit 56 (FIG. 1) although the information and control signals developed by the controls are supplied to the special purpose processor 80.

The sweep limit controls 148 and 150, when set, limit the sweep of the antenna in the vertical and horizontal directions respectively. These controls allow the pilot to narrow and focus on the radar return area. This allows for more frequent updating since the sweep cycle time is reduced if the sweep limits are reduced.

The latitude and longitude button 154, when depressed, signals the special purpose processor 80 to provide latitude and longitude grid lines for display on the display screen 112. A push of the latitude and longitude button 154 causes removal of the latitude and longitude grid lines from the display.

The heading cursor control 158 is a standard feature of conventional radars and serves to cause the radar system to produce a course heading line on the screen to show a heading for the aircraft.

The controls 162, 166, 170, 174 and 178 are all standard features of a conventional aircraft radar system. Control 162 controls the brightness of displayed terrain and weather conditions and moving map display information independently of the overall display brightness. Control 166 allows the pilot to select the scan mode for the cathode ray tube 156, that is, by stand-by, test, terrain and weather or terrain mapping.

Control 170 selects the range displayed in display 108. Long distances, such as two hundred miles, may supply a general, non-detailed view of major storms ahead, or shorter distances, such as thirty or forty miles, may give a detailed view of a storm. Control 170 sets the latitude and longitude area for display of both terrain and weather data and moving map data. Control 174 allows for manually positioning the tilt of the antenna 4 when control 144 is in the "normal" scan mode. Control 178 is an amplifier gain control function. Control 180 is a brightness and intensity control function of the images displayed on the screen 112.

In the plan view of FIG. 2, the contour lines show terrain elevation, as on conventional topographic maps. The aircraft symbol 111 shows the position of the aircraft relative to the terrain. In the vertical, frontal view the same features are directly above the plan view. The aircraft symbol 128 is displayed at the aircraft altitude on the same scale.

Figure 4A:
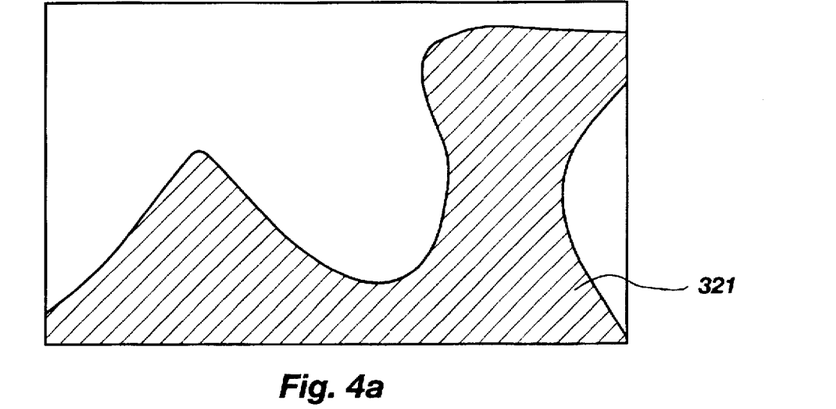
FIG. 4a is a partial view of the cathode ray tube showing a portion of a vertical display image obtained from a radar scan.
Figure 4B:
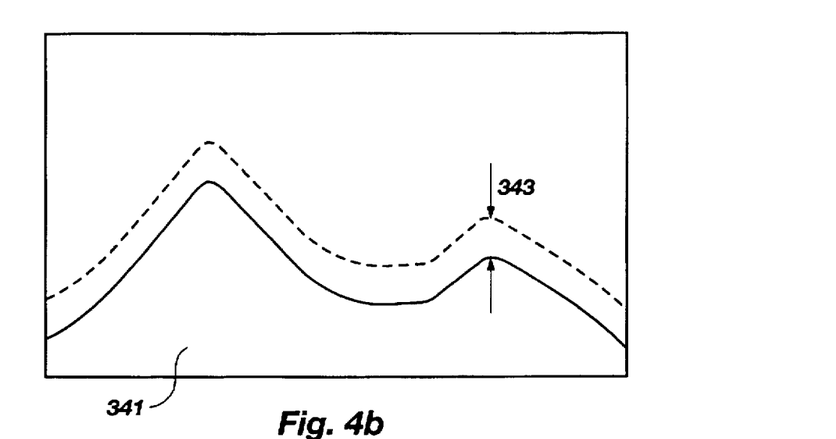
FIG. 4b is a partial view of the cathode ray tube showing a portion of the same vertical display image formed from stored terrain elevation data.
Figure 4C:
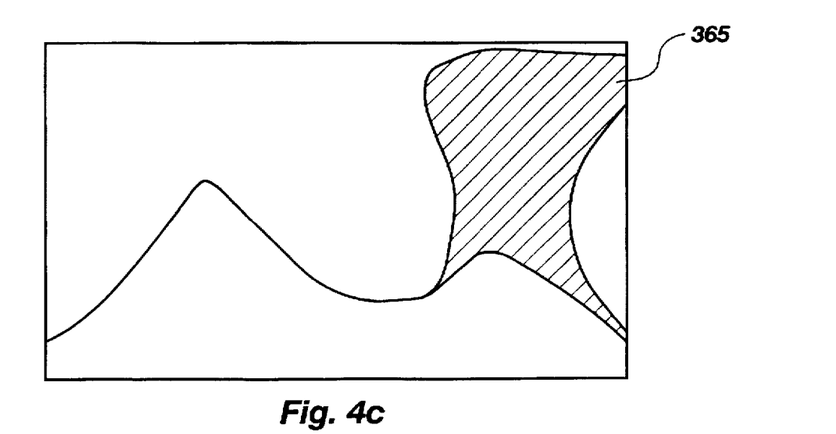
FIG. 4c is a partial view of the cathode ray tube showing a portion of the composite image obtained from the radar scan filtered with the stored terrain elevation data.

The system can distinguish between radar weather echoes and radar terrain echoes by blanking all radar returns at a selected elevation above the terrain elevation data in the terrain data base 94. FIG. 4a shows a portion the vertical display radar image 321 obtained from a radar scan. The radar return from weather conditions and the radar return from terrain are indistinguishable. FIG. 4b shows a portion of the vertical display terrain image 341 formed by the moving map generator from the data in the data base 93. The system can use the terrain data shown in FIG. 4b to filter the radar scan shown in FIG. 4a to produce the composite image shown in FIG. 4c. The resulting image 365 on the display in FIG. 4c excludes the terrain image 341 on the display in FIG. 4b plus a selected margin of elevation 343 above the terrain image data.

Figure 4D:
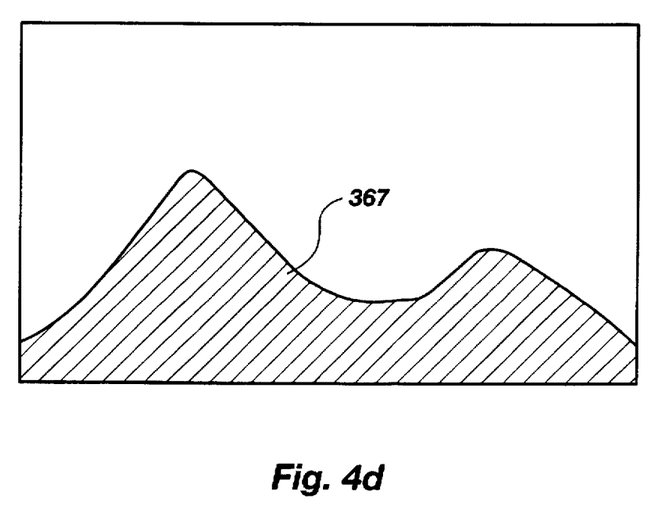
FIG. 4d is a partial view of the cathode ray tube showing a portion of a reversed composite image obtained from the radar scan filtered with the stored terrain elevation data.

Likewise, the system can use the terrain data shown in FIG. 4a to filter the radar scan shown in FIG. 4b to produce the composite image shown in FIG. 4d. The resulting image 367 on the display in FIG. 4c only includes the terrain image 341 on the display in FIG. 4b plus the selected margin of elevation 343 above the terrain image data. This would be useful for search and surveillance radars. The pilot could toggle between the ground and weather returns quickly and easily.

The pilot uses the terrain control knob 131 to signal the moving map generator to display the terrain elevation information and to adjust the intensity of the color if displayed. The terrain control knob TR, shown in FIG. 1, is a coaxial, three position switch with input to the central processor 64. In the first position, the terrain control knob signals the central processor to turn off the terrain display. In the second position, the terrain control knob signals the central processor to enable the terrain display by signaling the moving map generator to load the display RAM 95. The terrain control inner knob 133, shown in FIG. 2, controls the color intensity.

In position 3, the terrain control knob signals the central processor to enable the terrain display and to exclude from the radar display all radar returns originating from ground level or within a selected distance above the ground level. The selected distance is the selected margin of elevation 343 shown in FIG. 4b. The central processor receives from the moving map generator the maximum terrain elevations in each voxel and adds to each elevation the value of the selected margin. The pilot selects the margin by pulling out the terrain control inner knob 133 and twisting it. The central processor sends to the display RAM 95 the value margin for display on the CRT 56. The central processor 64 receives, from the memory 84 through the special purpose processor 80, the radar echoes to be displayed with their addresses. The central processor filters out all pixels with altitude addresses equal to or less than stored terrain elevation plus the margin and sends the composite image 365 to the display RAM 52.

FIG. 5a is a graphic representation of the horizontal range (or plan view) of radar returns and FIG. 5b is a graphic representation of the vertical range of radar returns. A constant band of voxels 521 ahead of the aircraft 523 will maintain a constant relationship with the aircraft and will move with the aircraft relative to terrain. The pilot can select the transverse length 525 of the band, the vertical distance 527 below the aircraft altitude, and the distance between the constant band and the aircraft 529. In setting this safety zone, the pilot should take into account the aircraft speed and its turning radius, plus a safety margin.

In setting the vertical clearance the pilot will consider the phase of flight, such as cruise over mountainous terrain or the approach segment. The moving map generator compares the vertical clearance altitude of the voxel band with the maximum terrain altitude within each voxel. If the latter equals or exceeds the former, an alert is set in the form of an optional audible warning sound and annunciation. Also, the pixels registering the conflict will be indicated in both plan and vertical views by some conspicuous means such as flashing. After receiving the warning, the pilot can visualize the potential conflict at a glance at the display and will also see the best escape route.

As shown in FIG. 2, the display mode control 144 provides choices of (1) plan view, (2) plan view and a vertical front view, (3) plan view and the vertical side views, and (4) plan view with both the vertical front view and the vertical side views. This control determines the display format of the special purpose processor 80, and through it and the central processor 64, the display 56.

The pilot uses the outer 153 and an inner alert knob 152 knob 152, FIG. 2, to set the terrain warning criteria. The switch has an. When the outer knob is turned clockwise, past a detent, it enables the inner knob to first set the width of the pixel zone of warning. A typical setting might be ten miles if the turning radius of the aircraft at an expected speed is five miles. The setting is displayed on CRT 56 at a margin of the field. CRT displays of parameter settings are commonly in use and well known in the industry. Next, the pilot can select the distance ahead of the aircraft that the warning band should be projected in space. An appropriate setting might also be ten miles. The same knob is used for this setting but it is pulled out and twisted. Finally, the pilot uses the outer knob to select the altitude clearance desired. The far counter clockwise position of the alert knob 152 will turn off the aural alarm. The central processor responds to these control settings by signalling the moving map generator to compare continually the elevations of the data points in the selected band of voxels with the aircraft altitude minus the altitude clearance zone set by control 152. The warning output is generated when a maximum elevation in a terrain voxel equals or exceeds the warning altitude.

In addition to providing an output to an aural alarm or warning device, the moving map generator increases the conspicuity of the pixels such as by flashing. It does so by signalling to display RAM 52 the addresses of the pixels that are to be emphasized.

If the pixels registering the conflict are on the left side of the extended center line of the aircraft and thus on the left side of the display screen an audible warning could command a "right turn" as well as a "pull up". Similarly, if the conflict were on the right, a warning voice and arrow could command a "left turn" as well as "pull up".

The pilot will then receive an audible and/or annunciator alert indicating the need for the pilot to glance at the display screen. On it the pilot will see the flashing indication in both plan and vertical views of the location where the potential conflict was discovered. The indication of that terrain that is near or above the aircraft altitude will be accentuated as by hatch marks. Thus, the most appropriate avoidance maneuver should be apparent to the pilot at a glance.

The pilot selects scale factor of the vertical displays with the Display Mode inner knob 146. The display mode inner knob sends the scale through the special purpose processor 80 and the central processor 64 to the moving map generator 89. All vertical displays show the weather conditions and the terrain elevation with the same scale. The critical terrain highlighted on the vertical view is directly above the corresponding critical terrain on the plan view.

FIG. 3 shows the screen with terrain features in the vertical, front view directly above the corresponding terrain features in the plan view. The vertical, side view displays those terrain features directly abeam the corresponding plan view features. The left side view include the features of the left half of the plan view and the right side view the features of the right half. As shown, the vertical display scale has been changed by the display mode inner knob 146 to give a maximum range of 10,000 feet. The aircraft symbol 228 is at an altitude of 7,000 feet and the terrain extends above 10,000 feet.

The system's displays do not show exact distances of the aircraft above the terrain as the display scales are gross. This system shows generally the location of threatening terrain rather than provide clearance information. This system supplements, rather than replaces, more precise warning devices such as the GPWS.

Figure 6:
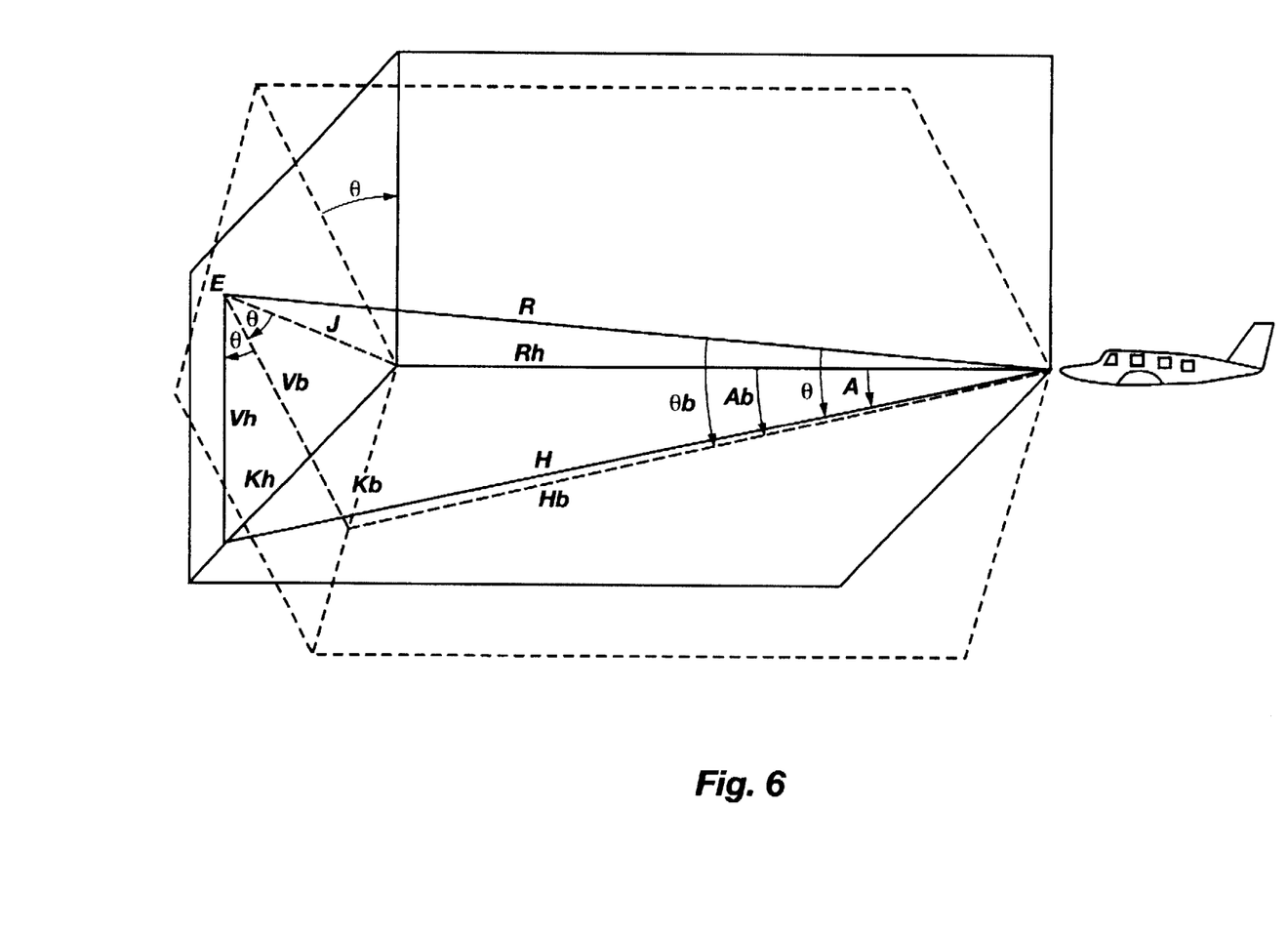
FIG. 6 is a three dimensional graphic representation of the roll corrections for a banked aircraft with stabilization off.

FIG. 6 shows a three dimensional graphic representation of the roll corrections for a banked aircraft with stabilization off. As noted above, this system can correct for roll and pitch with the stabilization off by directly supplying to a special purpose processor 80 the roll and pitch angles 72. The special purpose processor uses the pitch and roll angles, along with the antenna position relative to the aircraft and echo range, to calculate the actual position of an object shown by the radar returns.

In FIG. 6, the solid lines represent the aircraft level, the dashed lines represent the aircraft banked by B degrees. Also shown are the radar echo position E, the antenna slew $A_b$ in banked plane, the range R or distance to radar echo, the antenna elevation relative to the horizontal plane $\theta_b$ displaced by roll, the vertical distance $V_b$ to radar echo from horizontal plane displaced by roll angle, the distance $K_b$ from roll axis to $V_b$, the vertical distance $V_h$ from radar echo to horizontal plane, the distance $K_h$ from roll axis to $V_h$, the horizontal distance $R_h$ from aircraft position to plane of radar echo perpendicular to roll axis, the distance J from echo to roll axis, the angle D between J and vertical line from radar echo and horizontal displaced by roll angle, the distance H in horizontal plane form aircraft position to base of perpendicular line through radar echo, the distance $H_b$ in horizontal plane displaced by roll angle from aircraft position to base line through the radar echo that is perpendicular to displaced horizontal plane, and antenna tilt angle $\theta$ corrected for pitch of the aircraft.

As described in U.S. Pat. No. 5,202,690, the special purpose processor 80 can calculate the latitude E, longitude E' and altitude V relative to aircraft for each weather echo if supplied the track T, crab angle C, horizontal antenna deflection A, range to the echo R, and the antenna tilt angle $\theta$, as follows:

$$E = P + \frac{R}{60} \cos(T + A - C)$$

$$E' = P' - \frac{180}{\pi} \left| \left| \tan(T + A - C)[\ln \tan(45 + 0.5E) - \ln \tan(45 + 0.5P)] \right| \right|$$

$$V = R \sin \theta$$

With the stabilization on, the horizontal antenna deflection A and the antenna tilt angle $\theta$ are corrected for aircraft attitude. With the stabilization off, the special purpose processor 80 can calculate the horizontal antenna deflection A and the antenna tilt R from the pitch and roll information using the following formulas:

where

A antenna slew corrected for bank of the aircraft;

$$A = \frac{180}{\pi} \arctan \left[ \left[ \frac{\sin \Theta_b \times \left[ \sin B \cos \frac{180}{\pi} \arctan \left( \frac{\sin A_b}{\tan \Theta_b} \right) + \cos B \sin \frac{180}{\pi} \arctan \left( \frac{\sin A_b}{\tan \Theta_b} \right) \right]}{\cos \frac{180}{\pi} \arctan \left( \frac{\sin A_b}{\tan \Theta_b} \right) \cos \Theta_b \sin A_b} \right] \right]$$

-continued
$$\theta = \frac{180}{\pi} \arcsin \left[ \left[ \frac{\sin \Theta_b \times \left\{ \cos B \cos \left[ \frac{180}{\pi} \arctan \left( \frac{\sin A_b}{\tan \Theta_b} \right) \right] - \sin B \sin \left[ \frac{180}{\pi} \arctan \left( \frac{\sin A_b}{\tan \Theta_b} \right) \right] \right\}}{\cos \frac{180}{\pi} \arctan \left( \frac{\sin A_b}{\tan \Theta_b} \right)} \right] \right] - P$$

θ antenna tilt angle corrected for pitch of the aircraft;
$A_b$ antennaslew uncorrected for roll (banked);
$R$ range of radar echo;
$P$ pitch in degrees above or below horizontal;
$\Theta_b$ antenna elevation relative to the horizontal plane uncorrected for roll (banked);
$B$ bank angle.

The above described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

I claim:

1. A weather radar and terrain map display system for aircraft comprising means for transmitting radar signals out from the aircraft and for receiving back reflected radar signals, means for digitizing the reflected radar signals received by the transmitting and receiving means, means for calculating the latitude and longitude coordinates of the locations from which the reflected radar signals were reflected, first means for storing the digitized signals and the latitude and longitude coordinates calculated for the reflected radar signals, second means for storing terrain elevation data referenced to latitude and longitude coordinates of the ground over which the aircraft will travel, and display means, responsive to the first and second storing means, for simultaneously displaying a plan view image over a horizontal range (a) of weather, represented by digitized reflected radar signals, relative to the calculated latitude and longitude coordinates, and (b) terrain elevation data relative to the latitude and longitude coordinates of that data, said weather display and terrain data display being superimposed over one another.

2. A system as in claim 1 further comprising means for determining the altitude of the aircraft, means for comparing the altitude of the aircraft to the terrain elevation data and selecting the latitude and longitude coordinates of the critical terrain elevation data where the elevation of the terrain is at a selected level with respect to the altitude of the aircraft, and means for highlighting the image of the selected critical terrain elevation on the display means.

3. A system as in claim 2 further comprising means for producing an alarm signal when critical terrain elevation data is selected.

4. A system as in claim 1 wherein the display means, responsive to the first and second storing means, simultaneously displays a vertical view (a) of weather, represented by digitized reflected radar signals, relative to the calculated latitude and longitude coordinates and (b) terrain elevation data relative to the latitude and longitude coordinates of the terrain elevation data, the weather display and terrain data display being superimposed over one another.

5. A system as in claim 4 wherein the display means, responsive to the first and second storing means, for simultaneously displaying a vertical view includes a vertical front view (a) of weather, represented by digitized reflected radar signals, relative to the calculated latitude and longitude coordinates, and (b) terrain elevation data relative to the latitude and longitude coordinates of that data, said weather display and terrain data display being superimposed over one another, and at least one vertical side view (a) of weather, represented by digitized reflected radar signals, relative to the calculated latitude and longitude coordinates, and (b) terrain elevation data relative to the latitude and longitude coordinates of that data, said weather display and terrain data display being superimposed over each another.

6. A system as in claim 1 further comprising third means for storing an elevation coding table assigning a distinctive color and pattern to each range of elevation, and means for comparing the height in the terrain elevation data at each coordinate with the stored elevation color coding table, and assigning distinctive color and pattern to represent the terrain elevation height at each coordinate on the plan view image.

7. A system as in claim 1 further comprising means for retrieving the terrain elevation data relative at each coordinate to generate contour lines on the display means.

8. A system as in claim 1 further comprising navigation means for locating the present position of the aircraft and of superimposing an aircraft position marker at the latitude and longitude coordinates of the present position over the weather display and terrain data on the plan view image of the display means.

9. A system as in claim 4 further comprising means for determining the altitude of the aircraft, means for superimposing an aircraft position marker at the determined altitude of the aircraft over the weather display and terrain data on the vertical view image of the display means.

10. A system as in claim 1 further comprising third means for storing map data referenced to the latitude and longitude coordinates of the ground over which the aircraft will travel, display means, responsive to the first, second, and third storing means, for simultaneously displaying a plan view image over a horizontal range (a) of weather, represented by digitized reflected radar signals, relative to the calculated latitude and longitude coordinates, b) of the map data relative to the latitude and longitude coordinates of the map data, and (c) terrain elevation data relative to the latitude and longitude coordinates of that data, said weather display, map data display, and terrain data display being superimposed over each another.

11. A system as in claim 1 further comprising a region at a fixed distance from the aircraft, the region having a transverse length and a vertical distance, means for continually determining the latitude and longitude coordinates of locations within the region as the aircraft moves through space, and means for comparing the latitude and longitude coordinates of the locations within the region to the latitude and longitude of the stored terrain elevation data and for selecting the latitude and longitude of any location within the region that has the same latitude and longitude as any stored terrain elevation data.

12. A system as in claim 11 further comprising means for generating an output signal when the latitude and longitude of the terrain elevation data is selected.

13. A system as in claim 11 further comprising means for highlighting on the display the latitude and longitude of all the selected terrain elevation data.

14. A system as in claim 1 wherein the means for calculating the latitude and longitude coordinates includes means for calculating the latitude and longitude coordinates when antenna stabilization is not used.

15. A system as in claim 1 further wherein the means for calculating the latitude and longitude coordinates further comprises a means for calculating the antenna slew corrected for bank of the aircraft A and the antenna tilt angle corrected for pitch of the aircraft θ, given the antenna slew uncorrected for roll $A_b$, the range or distance of radar echo R, the pitch in degrees above or below horizontal P, the antenna elevation relative to the horizontal plane uncorrected for roll $θ_b$ and the bank angle B as follows:

the digitized radar signal and blocking those digitized radar signals where calculated elevation of the radar signal is below the corresponding terrain elevation.

display means, responsive to the filtering means, for displaying a plan view image over a horizontal range of weather, represented by the filtered digitized reflected radar signals, relative to the calculated latitude and longitude and elevation coordinates.

17. A system as in claim 16 wherein the display means, responsive to the filtering means, displays a vertical view image of weather, represented by the filtered digitized reflected radar signals, relative to the calculated latitude and longitude and elevation coordinates.

18. A system as in claim 16 further comprising a region at a fixed distance from the aircraft, the region having a transverse length and a vertical distance, means for continually determining the latitude and longitude coordinates of locations within the region as the aircraft moves through space, and means for comparing the latitude and longitude coordinates of the locations within the region to the latitude and longitude of the stored terrain elevation data and for selecting the latitude and longitude of any location within the region that has the same latitude and longitude as any stored terrain elevation data.

19. A system as in claim 18 further comprising means for generating an output signal when the latitude and longitude of the terrain elevation data is selected.

$$A = \frac{180}{\pi} \arctan \left[ \left[ \frac{\sin Θ_b \times \left[ \sin B \cos \frac{180}{\pi} \arctan \left( \frac{\sin A_b}{\tan Θ_b} \right) + \cos B \sin \frac{180}{\pi} \arctan \left( \frac{\sin A_b}{\tan Θ_b} \right) \right]}{\cos \frac{180}{\pi} \arctan \left( \frac{\sin A_b}{\tan Θ_b} \right) \cos Θ_b \sin A_b} \right] \right]$$

$$θ = \frac{180}{\pi} \arcsin \left[ \left[ \frac{\sin Θ_b \times \left\{ \cos B \cos \left[ \frac{180}{\pi} \arctan \left( \frac{\sin A_b}{\tan Θ_b} \right) \right] - \sin B \sin \left[ \frac{180}{\pi} \arctan \left( \frac{\sin A_b}{\tan Θ_b} \right) \right] \right\}}{\cos \frac{180}{\pi} \arctan \left( \frac{\sin A_b}{\tan Θ_b} \right)} \right] \right] - P$$

16. A weather radar and terrain map display system for aircraft comprising means for transmitting radar signals out from the aircraft and for receiving back reflected radar signals, means for digitizing the reflected radar signals received by the transmitting and receiving means, means for calculating the latitude, longitude, and elevation coordinates of the locations from which the reflected radar signals were reflected, first means for storing the digitized radar signals and the latitude, longitude, and elevation coordinates calculated for the reflected radar signals, second means for storing terrain elevation data referenced to latitude and longitude coordinates of the ground over which the aircraft will travel, filtering means, responsive to the first and second storing means, for comparing the digitized radar signals with the terrain elevation data at the same latitude and longitude as the latitude and longitude calculated for 20. A system as in claim 18 further comprising means for highlighting on the display the latitude and longitude of all the selected terrain elevation data.

21. A system as in claim 16 wherein the means for calculating the latitude and longitude coordinates includes means for calculating the latitude and longitude coordinates when antenna stabilization is not used.

22. A system as in claim 16 further wherein the means for calculating the latitude and longitude coordinates further comprises a means for calculating the antenna slew corrected for bank of the aircraft A and the antenna tilt angle corrected for pitch of the aircraft θ, given the antenna slew uncorrected for roll $A_b$, the range or distance of radar echo R, the pitch in degrees above or below horizontal P, the antenna elevation relative to the horizontal plane uncorrected for roll $θ_b$ and the bank angle B as follows:

$$A = \frac{180}{\pi} \arctan\left[\left[\frac{\sin\Theta_b \times \left[\sin B \cos\frac{180}{\pi}\arctan\left(\frac{\sin A_b}{\tan\Theta_b}\right) + \cos B \sin\frac{180}{\pi}\arctan\left(\frac{\sin A_b}{\tan\Theta_b}\right)\right]}{\cos\frac{180}{\pi}\arctan\left(\frac{\sin A_b}{\tan\Theta_b}\right)\cos\Theta_b \sin A_b}\right]\right]$$

$$\theta = \frac{180}{\pi} \arcsin\left[\left[\frac{\sin\Theta_b \times \left\{\cos B \cos\left[\frac{180}{\pi}\arctan\left(\frac{\sin A_b}{\tan\Theta_b}\right)\right] - \sin B \sin\left[\frac{180}{\pi}\arctan\left(\frac{\sin A_b}{\tan\Theta_b}\right)\right]\right\}}{\cos\frac{180}{\pi}\arctan\left(\frac{\sin A_b}{\tan\Theta_b}\right)}\right]\right] - P$$

23. A terrain map display system for aircraft comprising means for storing terrain elevation data referenced to latitude and longitude coordinates of the ground over which the aircraft will travel, and display means, responsive to the storing means, for displaying a plan view image over a horizontal range showing the terrain elevation data relative to the latitude and longitude coordinates of that data.

24. A system as in claim 23 further comprising means for determining the altitude of the aircraft, means for comparing the altitude of the aircraft to the terrain elevation data and selecting the latitude and longitude coordinates of the critical terrain elevation data where the elevation of the terrain is at a selected level with respect to the altitude of the aircraft, and means for highlighting the image of the selected critical terrain elevation on the display means.

25. A system as in claim 23 further comprising means for producing an alarm signal when critical terrain elevation data is selected.

26. A system as in claim 23 wherein the display means, responsive to the storing means, displays a vertical view showing the terrain elevation data relative to the latitude and longitude coordinates of that data.

27. A system as in claim 26 wherein the display means, responsive to storing means, for displaying a vertical view includes a vertical front view of terrain elevation data relative to the latitude and longitude coordinates of that data, and at least one vertical side view of terrain elevation data relative to the latitude and longitude coordinates of that data.

28. A system as in claim 23 further comprising fourth means for storing an elevation coding table assigning a distinctive color and pattern to each range of elevation, and means for comparing the height in the terrain elevation data at each coordinate with the stored elevation color coding table, and assigning distinctive color and pattern to represent the terrain elevation height at each coordinate on the plan view image.

29. A system as in claim 23 further comprising means for retrieving the terrain elevation data relative at each coordinate to generate contour lines on the display means.

30. A system as in claim 23 further comprising navigation means for locating the present position of the aircraft and of superimposing an aircraft position marker at the latitude and longitude coordinates of the present position over the terrain data on the plan view image of the display means.

31. A system as in claim 23 further comprising means for determining the altitude of the aircraft, means for superimposing an aircraft position marker at the determined altitude of the aircraft over the terrain data on the vertical view image of the display means.

32. A system as in claim 23 further comprising means for receiving radar signals with the latitude and longitude coordinates calculated for the radar signals, and wherein the display means, also responsive to the means for receiving radar signals, simultaneously displays (a) weather, represented by digitized radar signals, relative to the calculated latitude and longitude coordinates, and (b) terrain elevation data relative to the terrain elevation data relative to the latitude and longitude coordinates of that data, said weather display and terrain data display being superimposed over one another.

* * * * *